US008797541B2

(12) United States Patent
Duncan et al.

(10) Patent No.: US 8,797,541 B2
(45) Date of Patent: Aug. 5, 2014

(54) OPTICAL NETWORK CONFIGURATION WITH INTRINSIC DELAY FOR SWEPT-WAVELENGTH INTERFEROMETRY SYSTEMS

(75) Inventors: Roger Glen Duncan, Christiansburg, VA (US); Brooks A. Childers, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 412 days.

(21) Appl. No.: 13/180,059

(22) Filed: Jul. 11, 2011

(65) Prior Publication Data

US 2013/0016979 A1    Jan. 17, 2013

(51) Int. Cl.
*G01B 9/02* (2006.01)

(52) U.S. Cl.
USPC .......................................................... 356/478

(58) Field of Classification Search
USPC ................................ 356/477, 478, 35.5, 241.1
See application file for complete search history.

(56) References Cited

U.S. PATENT DOCUMENTS

| 4,596,466 | A | 6/1986 | Ulrich |
| 6,566,648 | B1 * | 5/2003 | Froggatt ................... 250/227.14 |
| 7,511,819 | B2 | 3/2009 | DiFoggio |
| 7,538,860 | B2 * | 5/2009 | Moore ........................ 356/35.5 |
| 2002/0176089 | A1 | 11/2002 | Szfraniec et al. |
| 2005/0024645 | A1 | 2/2005 | Dorrer |
| 2005/0088660 | A1 * | 4/2005 | Ronnekleiv .................... 356/478 |
| 2006/0152733 | A1 * | 7/2006 | Waagaard .................... 356/478 |
| 2007/0051882 | A1 | 3/2007 | Childers |
| 2007/0223003 | A1 * | 9/2007 | Koste et al. .................... 356/478 |
| 2009/0199630 | A1 | 8/2009 | DiFoggio et al. |
| 2010/0141930 | A1 | 6/2010 | Omichi et al. |
| 2010/0145648 | A1 | 6/2010 | Moore et al. |

FOREIGN PATENT DOCUMENTS

WO    WO9403406 A1    2/1994

OTHER PUBLICATIONS

Duncan, Roger G.; "Distributed sensing technique for test article damage detection and monitoring," Proceedings vol. 5050, Smart Structures and Materials 2003, Smart Sensor Technology and Measurement Systems, pp. 367-375.
International Search Report and Written Opinion dated Dec. 6, 2012 for International Application No. PCT/US2012/040103.

* cited by examiner

*Primary Examiner* — Jonathan Hansen
(74) *Attorney, Agent, or Firm* — Cantor Colburn LLP

(57) ABSTRACT

A method, apparatus and optical network for obtaining a signal from a sensor in a fiber optic cable at a downhole location is disclosed. A reference signal is propagated through the fiber optic cable. A beam of light is received from the fiber optic cable, wherein the beam of light includes the propagated reference signal and the signal from the sensor generated from an interaction of the sensor and the reference signal. The propagated reference signal is obtained from the received beam of light. The signal from the sensors is obtained by sampling the received beam of light using the obtained propagated reference signal.

17 Claims, 2 Drawing Sheets

OPTICAL NETWORK CONFIGURATION WITH INTRINSIC DELAY FOR SWEPT-WAVELENGTH INTERFEROMETRY SYSTEMS

BACKGROUND OF THE DISCLOSURE

1. Field of the Disclosure

The present disclosure relates to obtaining signals in a swept-wavelength system used in oil exploration and production.

2. Description of the Related Art

In various aspects of oil exploration and production, optical sensors are deployed downhole and a light source at a surface location supplies a measurement light beam to the optical sensors over a fiber optic cable. Upon interaction with the optical sensors, the measurement beam is sampled at the surface location to obtain measurements using a synchronized trigger signal obtained from a suitable light beam (trigger beam). In swept-wavelength interferometry systems, in which the light source is swept across a range of wavelengths, synchronization can be difficult. Since the optical path length for the returned light (typically 10 kilometers or more in oil exploration and production) is much greater than the optical path of the trigger beam (typically a few meters), the measurement beam returning to the surface location is often delayed with respect to the trigger beam, resulting in a loss of synchronization. Current methods for compensating for the differences in optical path length require introducing fiber optic cable and/or optical switches into the path of the trigger beam. These methods are often cumbersome and space-consuming and can produce signal loss. The present disclosure provides a method and apparatus for obtaining a measurement from a sensor using an intrinsic delay of the fiber optic cable.

SUMMARY OF THE DISCLOSURE

In one aspect, the present disclosure provides a method of obtaining a signal from a sensor in a fiber optic cable at a downhole location, the method including: propagating a reference signal through the fiber optic cable; receiving from the fiber optic cable a beam of light that includes the propagated reference signal and the signal generated from an interaction of the sensor and the reference signal; obtaining the propagated reference signal from the received beam of light; and obtaining the signal from the sensor by sampling the received beam of light using the obtained propagated reference signal.

In another aspect, the present disclosure provides an apparatus for obtaining a signal from a sensor in a fiber optic cable, including a light source configured to propagate a reference signal through the fiber optic cable; and a circuit configured to: (i) receive a beam of light from the fiber optic cable that includes the reference signal after it has propagated through the fiber optic cable and a signal from the sensor responsive to the reference signal, (ii) obtain the reference signal after it has propagated through the fiber optic cable from the received beam of light, and (iii) obtain the signal from the sensor from the received beam of light in response to the obtained reference signal.

In another aspect, the present disclosure provides an optical network, including: a fiber optic cable including a sensor configured to provide signals relating to a parameter of interest; a light source configured to propagate a reference signal through the fiber optic cable at a plurality of wavelengths; a splitter configured to split a light beam received from the fiber optic cable into a first light beam and a second light beam, each such light beam including the reference signal after it has propagated through the fiber optic cable ("reference signal with an intrinsic delay") and a signal from the sensor responsive to the reference signal propagated by the light source ("sensor signal"); a trigger circuit configured to generate a trigger signal corresponding to the reference signal with the intrinsic delay corresponding to a wavelength in the plurality of wavelengths; and a sampling circuit configured to sample the first light beam in response to each trigger signal.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, references should be made to the following detailed description of the exemplary embodiment, taken in conjunction with the accompanying drawings, in which like elements have been given like numerals and wherein.

DETAILED DESCRIPTION OF THE DISCLOSURE

Figure 1:
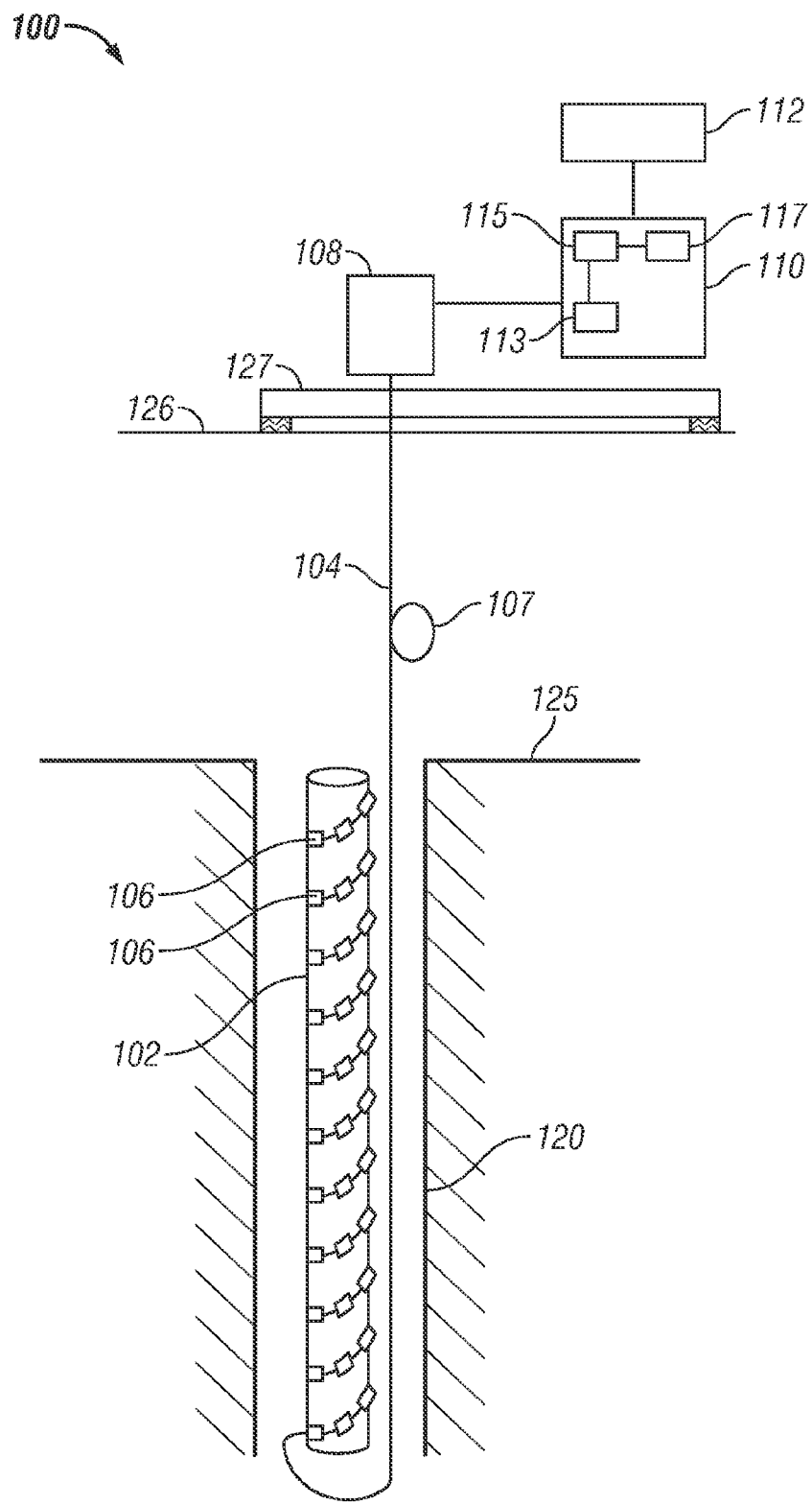
FIG. 1 shows an exemplary oil production system suitable for use with the exemplary methods and optical system described herein.

FIG. 1 shows an exemplary oil production system 100 suitable for use with the exemplary methods and optical system described herein. The exemplary production system 100 of FIG. 1 includes a tubular 102 in wellbore 120 in optical communication with surface electronics via fiber optic cable 104. Fiber optic cable 104 includes a plurality of sensors 106. Each of the plurality of sensors 106 is configured to provide an optical signal. The fiber optic cable 104 is wrapped around the surface of the tubular 102 and each of the plurality of sensors 106 of fiber optic cable 104 is thereby attached at a particular location to tubular 102. A change in a parameter of the tubular, such as strain or temperature, at the particular location is therefore detected by the sensor attached at or near the particular location, which thereby provides a signal corresponding to the detected change in parameter. These signals may be processed at surface electronics to obtain a result such as, for example, a deformation of the tubular using Real Time Compaction Monitoring (RTCM), a temperature at the tubular using Distributed Temperature Sensing (DTS), optical frequency domain reflectometry (OFDR), or any applicable methods using swept-wavelength interferometry.

Fiber optic cable 104 is coupled at the surface location to an interrogation unit 108. The interrogation unit 108 may include a light source (not shown), typically a tunable laser for providing light to the sensors via fiber optic cable 104 as well as various optical elements, and circuitry for obtaining signals from light received from the plurality of sensors 106. Various details of the interrogation unit are described in reference to FIG. 2. Interrogation unit 108 may be coupled to a data processing unit 110 and in one aspect transmits obtained signals to the data processing unit. In one aspect, the data processing unit 110 receives and processes the measured signals from the interrogation unit 108 to obtain one or more measurements, such as a measurement of wavelength, strain or temperature at the tubular. In various aspects, data processing unit 110 includes at least one memory 115 having various programs and data stored therein, a computer or processor 113 accessible to the memory and configured to access one or more of the programs and/or data stored therein to obtain the measurement, and a recording medium 117 for recording and storing the obtained measurement. The data processing unit 110 may output the measurement to various devices, such as a display 112 or the recording medium 117.

The exemplary production system 100 of FIG. 1 is a subsea oil production system including sensors at a tubular 102 at a sea bottom location 125 in communication with surface electronics (i.e., interrogation unit 108) located at a sea platform 127 at sea level 126. An alternate embodiment may include a system deployed at a land location. Other exemplary systems may include an oil exploration system, an oil production system, a measurement-while-drilling tool, or a wireline logging device, among others. Although not a limitation of the disclosure, an exemplary system suitable for using the methods and optical system disclosed herein are often characterized by a large separation distance between light/surface electronics and sensors. A typical separation distance may be 1 km or more. In swept-wavelength systems, discussed below, this separation distance typically leads to synchronization problems in prior art methods.

The path a light takes to travel from a first place to a second place within the optical system is known as an optical path. The distance travelled over an optical path is referred to herein as an optical path length or optical delay. In the system of FIG. 1, due to the distance between light source/surface electronics and sensors in the exemplary system 100, the optical delay for light along this optical path is considerable (i.e., 100 microseconds). The distance between source/electronics and the plurality sensors, as illustrated in the exemplary embodiment of FIG. 1, is represented by optical delay 107 which is shown in fiber optic cable 106.

Figure 2:
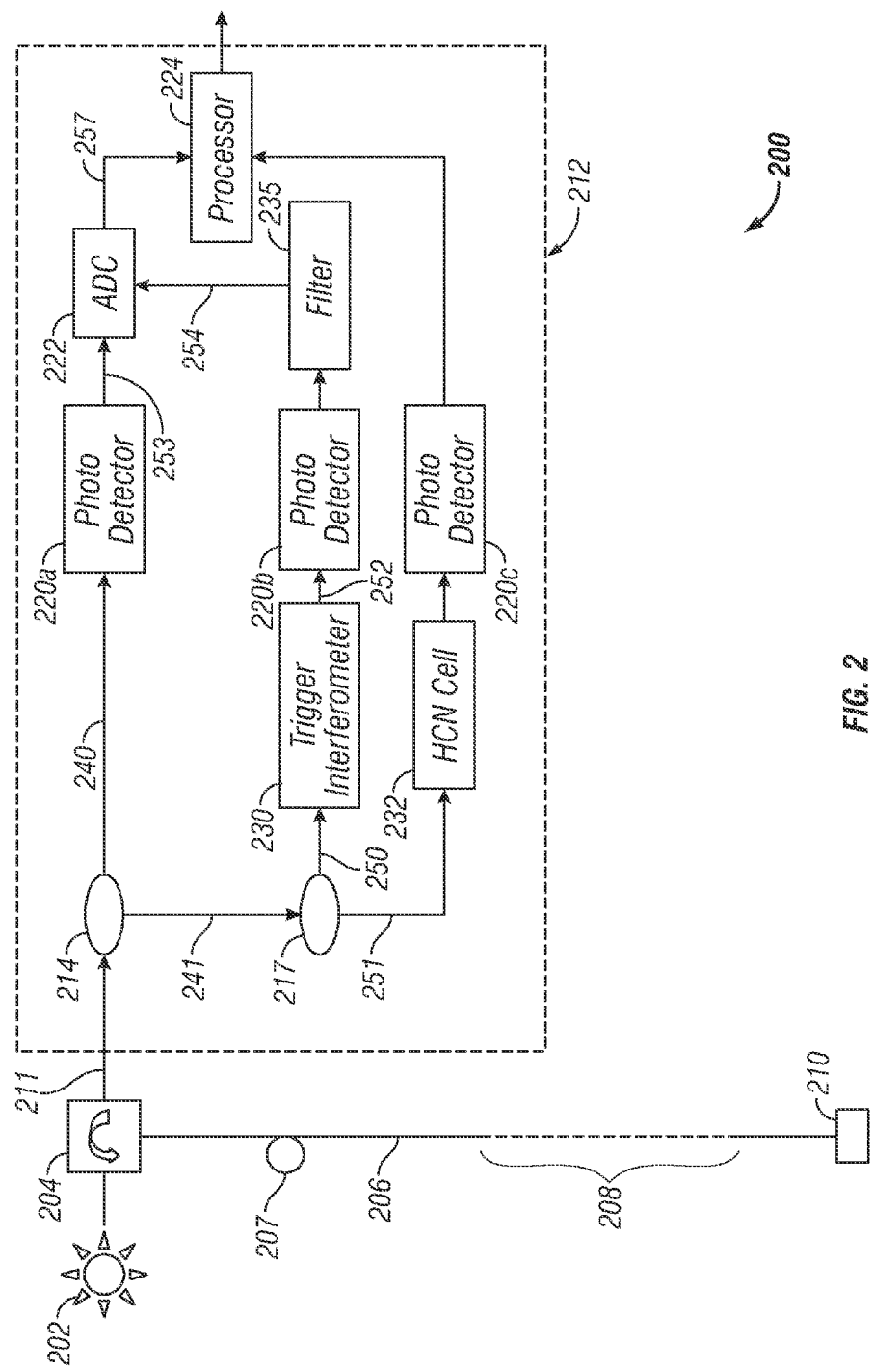
FIG. 2 shows a diagram of an exemplary system for obtaining a measurement from a sensor in a fiber optic cable suitable for use in the exemplary oil production system of FIG. 1.

FIG. 2 shows a diagram of an exemplary system 200 suitable for use with the exemplary production system 100 of FIG. 1. The exemplary system 200 uses an intrinsic delay of a fiber optic cable, such as the optical delay of the fiber optic cable 104 to prevent synchronization problems, for example, in signal sampling. The exemplary system 200 includes a light source 202, a fiber optic cable 206 having one or more sensors 208 formed therein and various optical and electronic devices, referred to herein as surface electronics 212, for obtaining one or more signals related to the one or more sensors 208. The light source is configured to provide light that sweeps across a selected range of wavelengths at a selected sweep rate, wherein the selected range of wavelengths includes the Bragg wavelengths of the one or more sensors 208. In an exemplary embodiment, light source 202 is a tunable laser light source that is configured to sweep across a range of wavelengths at a selected rate, thereby providing a reference signal that sweeps a plurality of wavelengths. However, the light source may be any tunable light source or a swept-wavelength light source that provides a reference signal that sweeps across a range of wavelengths. In various aspects, the light source may be a continuous light source or a broadband light source having a filter configured to sweep a range of wavelengths. The range of wavelengths and sweep rate of the light source may be pre-programmed or provided by a controller running software or by an operator. The light provided by the light source can be considered to provide a reference signal (the light), wherein the reference signal is provided at a plurality of wavelengths over a range of wavelengths.

In one embodiment, a circulator 204 may be used to direct light to various optical components within system 200. A circulator receives light at one of a plurality of ports and directs the received light to exit the circulator at another of the plurality of ports. In an alternate embodiment, a standard optical coupler may be used to perform the function of the circulator. In the exemplary embodiment, circulator 204 directs light from light source 202 into fiber optic cable 206 and directs light returning to the circulator from the fiber optic cable 206 to surface electronics 212.

Fiber optic cable 206 includes one or more sensors 208 and a reference reflector 210. In an exemplary embodiment, the one or more sensors 208 are Fiber-Bragg Gratings (FBGs). An FBG is a periodic change in the refractive index of the core of an optical fiber and is typically created using a laser etching process. An FBG reflects a percentage of incoming light, but only at a specific wavelength known as the Bragg wavelength, which is directly related to a grating period of the FBG. Any environmental factors, such as thermal changes or mechanical stress, affect the grating period and therefore produce changes in the Bragg wavelength. Thus, a measured shift in a wavelength of light reflected from an FBG may be used to determine a change in such environmental factors, i.e., temperature, strain, etc. Since each sensor typically experiences a different strain, the signals (i.e., reflected wavelengths) from the one or more of sensors are spread over a range of wavelengths. Fiber optic cable is therefore configured to propagate light from the circulator 204 downhole and to propagate light reflected by any of the one or more sensors 208 and by the reference reflector 210 uphole towards the circulator. Reference reflector 210 reflects light from the light source to direct the reference signal of the light uphole. In one aspect, an interference pattern of the reference signal and the light obtained from a sensor at a particular location may be used to identify the location of the sensor produced the sensor signal.

A light beam 211 is therefore received from the fiber optic cable 206 at the surface electronics 212. Surface electronics 212 includes an optical domain of optical devices for receiving, directing, measuring the received light, etc. as well as an electrical domain of electrical devices that perform various operations on electrical signals related to light signals in the optical domain. Photodetectors 220a-c convert light signals in the optical domain to electrical signals in the electrical domain. The received light beam 211 includes at least two signals: the reference signal and one or more signals from the one or more sensors in the fiber optic cable 206 generated in response to an interaction of the reference signal and the one or more sensors. The reference signal of the received light beam has an intrinsic delay related to its propagation along the length of the fiber optic cable. Exemplary surface electronics 212 includes a first beam splitter 214 for splitting the received light beam 211 into a first light beam 240 and a second light beam 241. Each of the first light beam 240 and the second light beam 241 includes the reference signal and the one or more signals obtained from the sensors. In an exemplary embodiment, first beam splitter 214 splits the received light beam 211 so that first beam 240 receives 90% of the light of the received light beam and second beam 241 receives 10% of the light of the received light beam. However, any splitting ratio may be used. The first light beam 240 may be detected at a detector 220a which may be a photodetector or charge-coupled device, for example. Detector 220a may in one embodiment produce an electrical signal that in response to the waveform of the first beam 240. The produced electrical signal is sent from detector 220a to analog-to-digital converter (ADC) 222, which in one aspect is a sampling device (sampler) for sampling the electrical signal.

Second light beam 241 may be sent to a second beam splitter 217 which splits the second beam 241 into a third light beam 250 and a fourth light beam 251. In an exemplary embodiment, second beam splitter 217 splits the second light beam 241 along a 50/50 ratio, although any splitting ratio may be used. Each of the third light beam 250 and the fourth light beam 251 includes the reference signal and the sensors signals from the one or more sensors and include the intrinsic delay of the reference signal propagated through the fiber optic cable. The third light beam 250 may be sent to a trigger interferometer 230 and the fourth light beam 252 sent to a calibration cell 232. In one embodiment, third light beam 250 is provided directly from second beam splitter 217 to trigger interferometer 230. A trigger signal provided from the trigger interferometer 230 is sent to a photodetector 220b which produces an electrical signal in response to the trigger signal. The electrical signal created at photodetector 220b is filtered at filter 235 to obtain a signal related to the reference signal. The filtered electrical signal 254 is sent to a signal sampler such as analog-to-digital converter (ADC) 222 and is used to activate sampling of electrical signal 253 at the signal sampler. The sampler 222 thereby obtains the sensor signal related to a particular sensor in fiber optic cable 206. Calibration cell 232 may be a Hydrogen-cyanide (HCN) cell or any suitable cell used for calibrating a signal. A signal produced at the calibration cell is sent to photodetector 220c to create an electrical signal for use a processor 224.

Referring to the exemplary embodiment of FIG. 2, trigger interferometer 230 generates a trigger signal from the reference signal obtained from the third light beam 250. In an exemplary embodiment, the trigger signal 252 is generated using an interferometer 230. The trigger signal may be generated from a negative-to-positive zero-crossing such as a transition from a dark region of the fringe pattern to an adjacent illuminated region of the fringe pattern. In an alternate embodiment, trigger signal 252 may be produced from a positive-to-negative zero-crossing, i.e., a transition from an illuminated region of the fringe pattern to an adjacent dark region of the fringe pattern. Additionally, any part of the fringe pattern may be used to produce a trigger signal.

Since the first beam of light 240 and the second beam of light 241 are derived from the same light propagated through the fiber optic cable, they have substantially the same or related optical delay. Therefore the delay of the electrical signal 254 is substantially the same as the delay of the electrical signal 253. Therefore, there is no need to adjust for delay between trigger signal and the sampled signals.

In an exemplary embodiment, sampler 222 provides sampled signal 257 to processor 224. Processor 224 may obtain a parameter from sampled signal 257 which may be, for example, a wavelength corresponding to a particular sensor, a wavelength shift produced at the particular sensor, a strain at the sensor, or a temperature at the sensor. Processor may also be used to calibrate sampled signal 257 using a calibration signal received from calibration cell 232. The calibration signal in one embodiment is responsive to the exemplary fourth beam of light 251. Processed signals may be output, for example to data processing unit 110 of FIG. 1 or to a suitable storage medium. Alternatively, sampled signal 257 may be sent directly to data processing unit 110 which may perform the methods described above with respect to processor 224.

Therefore, in one aspect, the present disclosure provides a method of obtaining a signal from a sensor in a fiber optic cable at a downhole location, the method including: propagating a reference signal through the fiber optic cable; receiving from the fiber optic cable a beam of light that includes the propagated reference signal and the signal generated from an interaction of the sensor and the reference signal; obtaining the propagated reference signal from the received beam of light; and obtaining the signal from the sensor by sampling the received beam of light using the obtained propagated reference signal. The reference signal may be propagated at a plurality of wavelengths over a range of wavelengths. In one embodiment, the received beam of light is split into a first beam of light and a second beam of light. The propagated reference signal may be obtained from the second beam of light. A trigger signal may be generated from the obtained propagated reference signal; and the trigger signal may be used to sample the first beam of light to obtain the signal from the sensor. The method further includes processing the obtained signals from the sensor to estimate a parameter of interest. The parameter of interest may be selected from a group consisting of a: (i) wavelength corresponding to the sensor; (ii) wavelength shift produced at the sensor; (iii) a strain at the sensor; and (iv) a temperature at the sensor. In one embodiment, the obtained sensor signal is calibrated by comparing the obtained sensor signal to a calibration signal.

In another aspect, the present disclosure provides an apparatus for obtaining a signal from a sensor in a fiber optic cable, including a light source configured to propagate a reference signal through the fiber optic cable; and a circuit configured to: (i) receive a beam of light from the fiber optic cable that includes the reference signal after it has propagated through the fiber optic cable and a signal from the sensor responsive to the reference signal, (ii) obtain the reference signal after it has propagated through the fiber optic cable from the received beam of light, and (iii) obtain the signal from the sensor from the received beam of light in response to the obtained reference signal. The circuit may further include a splitter that splits the received beam of light into a first light beam and a second light beam, wherein each of the first light beam and the second light beam includes the reference signal after it has propagated through the fiber optic cable and the signal from the sensor. The apparatus may further include a trigger circuit configured to obtain the reference signal after it has propagated through the fiber optic cable from the beam of light received from the fiber optic cable. The apparatus may also include a sampling circuit configured to sample a signal corresponding to the beam of light received from the fiber optic cable to obtain the signal from the sensor responsive to the reference signal. In one embodiment, the light source is configured to sweep wavelength of the reference signal over a range of wavelengths. A detector may be configured to provide electrical signals related to the received beam of light from the fiber optic cable. The apparatus may further include a processor configured to determine from the obtained signal from the sensor at least one of: (i) a wavelength corresponding to the sensor; (ii) a wavelength shift produced at the sensor; (iii) a strain at the sensor, and (iv) a temperature at the sensor. The processor may be further configured to calibrate the obtained signal from the sensor responsive to the reference signal using a calibration signal.

In another aspect, the present disclosure provides an optical network, including: a fiber optic cable including a sensor configured to provide signals relating to a parameter of interest; a light source configured to propagate a reference signal through the fiber optic cable at a plurality of wavelengths; a splitter configured to split a light beam received from the fiber optic cable into a first light beam and a second light beam, each such light beam including the reference signal after it has propagated through the fiber optic cable ("reference signal with an intrinsic delay") and a signal from the sensor responsive to the reference signal propagated by the light source ("sensor signal"); a trigger circuit configured to generate a trigger signal corresponding to the reference signal with the intrinsic delay corresponding to a wavelength in the plurality of wavelengths; and a sampling circuit configured to sample the first light beam in response to each trigger signal. The fiber optic cable may be deployed in a wellbore. Also, the light source can be at a surface location. In one aspect, the optical network includes a processor configured to process signals from the sampling circuit to estimate a parameter of interest.

While the foregoing disclosure is directed to the exemplary embodiments of the disclosure, various modifications will be apparent to those skilled in the art. It is intended that all variations within the scope and spirit of the appended claims be embraced by the foregoing disclosure.

What is claimed is:

1. A method of obtaining a signal from a sensor in a fiber optic cable at a downhole location, comprising:
    propagating a reference signal through the fiber optic cable;
    receiving from the fiber optic cable a beam of light that includes the propagated reference signal and the signal generated from an interaction of the sensor and the reference signal;
    obtaining the propagated reference signal from the received beam of light from the fiber optic cable;
    generating a trigger signal from the reference signal obtained from the fiber optic cable; and
    obtaining the signal from the sensor by sampling the received beam of light using the generated trigger signal.

2. The method of claim 1, further comprising propagating the reference signal at a plurality of wavelengths over a range of wavelengths.

3. The method of claim 1 further comprising splitting the received beam of light into a first beam of light and a second beam of light.

4. The method of claim 3 further comprising obtaining the propagated reference signal from the second beam of light.

5. The method of claim 1 further comprising processing the obtained signals from the sensor to estimate a parameter of interest.

6. The method of claim 1, wherein the parameter of interest is selected from a group consisting of a: (i) wavelength corresponding to the sensor; (ii) wavelength shift produced at the sensor; (iii) a strain at the sensor; and (iv) a temperature at the sensor.

7. The method of claim 1 further comprising calibrating the obtained sensor signal by comparing the obtained sensor signal to a calibration signal.

8. An apparatus for obtaining a signal from a sensor in a fiber optic cable, comprising:
    a light source configured to propagate a reference signal through the fiber optic cable;
    a trigger circuit configured to:
        receive a beam of light from the fiber optic cable that includes the reference signal after it has propagated through the fiber optic cable and a signal from the sensor responsive to the reference signal,
        obtain the reference signal after it has propagated through the fiber optic cable from the received beam of light, and
        generate a trigger signal from the obtained reference signal; and a sampling circuit configured to obtain the signal from the sensor from the received beam of light by sampling the received beam of light using the generated trigger signal.

9. The apparatus of claim 8, wherein the circuit further comprises a splitter that splits the received beam of light into a first light beam and a second light beam, wherein each of the first light beam and the second light beam includes the reference signal after it has propagated through the fiber optic cable and the signal from the sensor.

10. The apparatus of claim 8 further comprising a trigger circuit configured to obtain the reference signal after it has propagated through the fiber optic cable from the beam of light received from the fiber optic cable.

11. The apparatus of claim 8, wherein the light source is configured to sweep wavelength of the reference signal over a range of wavelengths.

12. The apparatus of claim 8 further comprising a detector configured to provide electrical signals related to the received beam of light from the fiber optic cable.

13. The apparatus of claim 8 further comprising a processor configured to determine from the obtained signal from the sensor at least one of: (i) a wavelength corresponding to the sensor; (ii) a wavelength shift produced at the sensor; (iii) a strain at the sensor, and (iv) a temperature at the sensor.

14. The apparatus of claim 8 further comprising a processor configured to calibrate the obtained signal from the sensor responsive to the reference signal using a calibration signal.

15. An optical network, comprising:
    a fiber optic cable including a sensor configured to provide signals relating to a parameter of interest;
    a light source configured to propagate a reference signal through the fiber optic cable at a plurality of wavelengths;
    a splitter configured to split a light beam received from the fiber optic cable into a first light beam and a second light beam, each such light beam including the reference signal having an intrinsic delay after it has propagated through the fiber optic cable and a sensor signal obtained from the sensor in response to the reference signal propagated by the light source interacting with the sensor;
    a trigger circuit configured to generate a trigger signal corresponding to the reference signal having the intrinsic delay, the trigger signal corresponding to a wavelength in the plurality of wavelengths; and
    a sampling circuit configured to sample the first light beam in response to receiving the trigger signal generated at the trigger circuit.

16. The optical network of claim 15, wherein the fiber optic cable is deployed in a wellbore and the light source is at a surface location.

17. The optical network of claim 16 further comprising a processor configured to process signals from the sampling circuit to estimate a parameter of interest.

* * * * *